(12) United States Patent
Vandervaart et al.

(10) Patent No.: US 9,879,601 B2
(45) Date of Patent: Jan. 30, 2018

(54) GAS TURBINE ENGINE COMPONENT ARRANGEMENT

(71) Applicant: Rolls-Royce North American Technologies, Inc., Indianapolis, IN (US)

(72) Inventors: Peter C. Vandervaart, Indianapolis, IN (US); Jeffrey F. Rhodes, Zionsville, IN (US); Okey Kwon, Indianapolis, IN (US); Tab M. Heffernan, Plainfield, IN (US); Brett J. Barker, Dublin, OH (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 788 days.

(21) Appl. No.: 14/145,172

(22) Filed: Dec. 31, 2013

(65) Prior Publication Data

US 2015/0300257 A1 Oct. 22, 2015

Related U.S. Application Data

(60) Provisional application No. 61/772,800, filed on Mar. 5, 2013.

(51) Int. Cl.
*F01D 5/18* (2006.01)
*F02C 7/12* (2006.01)

(52) U.S. Cl.
CPC .............. *F02C 7/12* (2013.01); *F01D 5/182* (2013.01); *F01D 5/183* (2013.01);
(Continued)

(58) Field of Classification Search
CPC ................... F01D 5/186; F01D 5/187
See application file for complete search history.

(56) References Cited

U.S. PATENT DOCUMENTS

| 732,290 A | 12/1902 | Frame |
|---|---|---|
| 3,859,785 A | 1/1975 | Leto et al. |

(Continued)

FOREIGN PATENT DOCUMENTS

| EP | 0896127 A2 | 2/1999 |
|---|---|---|
| EP | 1467064 A2 | 10/2004 |

(Continued)

OTHER PUBLICATIONS

International Search Report for PCT International Application Serial No. PCT/US2013/078469, completed Apr. 28, 2014.

*Primary Examiner* — Justin Seabe
(74) *Attorney, Agent, or Firm* — Barnes & Thornburg LLP

(57) ABSTRACT

A gas turbine engine component is provided that can be cooled with a cooling media such as air using a variety of passages. In one form, cooling fluid is routed through a hole that exits at least partially through a pedestal formed between walls. A plurality of cooling holes can be provided through a trench face and in some forms can include a diffusion through a divergence in the hole exit. J-Hook passages can be provided through a trench face, and, in some forms, multiple trenches can be provided. A cooling hole having a neck portion can be provided, as can a cooling hole with one or more turns to reduce a total pressure. In one form, a corrugated cooling passage can be provided.

13 Claims, 5 Drawing Sheets

(52) U.S. Cl.
CPC .. *F05D 2260/201* (2013.01); *F05D 2260/202* (2013.01); *F05D 2260/203* (2013.01); *F05D 2260/2212* (2013.01); *F05D 2260/22141* (2013.01); *Y02T 50/676* (2013.01)

(56) References Cited

U.S. PATENT DOCUMENTS

| | | | |
|---|---|---|---|
| 4,063,851 A | 12/1977 | Weldon | |
| 4,637,449 A | 1/1987 | Mills et al. | |
| 4,672,727 A | 6/1987 | Field | |
| 4,762,464 A | 8/1988 | Vertz et al. | |
| 4,992,025 A | 2/1991 | Stroud et al. | |
| 5,062,768 A | 11/1991 | Marriage | |
| 5,152,667 A | 10/1992 | Turner et al. | |
| 5,246,340 A | 9/1993 | Winstanley et al. | |
| 5,288,207 A | 2/1994 | Linask | |
| 5,353,865 A | 10/1994 | Adiutori et al. | |
| 5,374,162 A | 12/1994 | Green | |
| 5,383,766 A | 1/1995 | Przirembel et al. | |
| 5,387,085 A | 2/1995 | Thomas et al. | |
| 5,392,515 A | 2/1995 | Auxier et al. | |
| 5,405,242 A | 4/1995 | Auxier et al. | |
| 5,419,039 A | 5/1995 | Auxier et al. | |
| 5,419,681 A | 5/1995 | Lee | |
| 5,458,461 A | 10/1995 | Lee et al. | |
| 5,472,316 A | 12/1995 | Taslim et al. | |
| 5,496,151 A | 3/1996 | Coudray et al. | |
| 5,498,133 A | 3/1996 | Lee | |
| 5,511,946 A | 4/1996 | Lee et al. | |
| 5,533,864 A | 7/1996 | Nomoto et al. | |
| 5,649,806 A | 7/1997 | Scricca et al. | |
| 5,702,232 A | 12/1997 | Moore | |
| 5,813,836 A | 9/1998 | Starkweather | |
| 5,816,777 A | 10/1998 | Hall | |
| 5,820,774 A | 10/1998 | Dietrich et al. | |
| 5,931,638 A | 8/1999 | Krause et al. | |
| 5,941,686 A | 8/1999 | Gupta et al. | |
| 6,000,908 A | 12/1999 | Bunker | |
| 6,176,676 B1 | 1/2001 | Ikeda et al. | |
| 6,183,199 B1 | 2/2001 | Beeck et al. | |
| 6,213,714 B1 | 4/2001 | Rhodes | |
| 6,224,339 B1 | 5/2001 | Rhodes et al. | |
| 6,234,754 B1 | 5/2001 | Zelesky et al. | |
| 6,247,896 B1 | 6/2001 | Auxier et al. | |
| 6,267,552 B1 | 7/2001 | Weigand | |
| 6,322,322 B1 | 11/2001 | Rhodes et al. | |
| 6,379,118 B2 | 4/2002 | Lutum et al. | |
| 6,383,602 B1 | 5/2002 | Fric et al. | |
| 6,402,470 B1 | 6/2002 | Kvasnak et al. | |
| 6,547,525 B2 | 4/2003 | Haehnle et al. | |
| 6,612,808 B2 | 9/2003 | Lee et al. | |
| 6,729,140 B2 | 5/2004 | Care et al. | |
| 6,744,010 B1 | 6/2004 | Pepe et al. | |
| 6,832,486 B2 | 12/2004 | Care et al. | |
| 6,890,153 B2 | 5/2005 | Demers et al. | |
| 6,894,100 B2 | 5/2005 | Miyoshi et al. | |
| 6,955,522 B2 * | 10/2005 | Cunha | F01D 5/186 415/115 |
| 7,033,135 B2 | 4/2006 | Mortzheim et al. | |
| 7,186,085 B2 | 3/2007 | Lee | |
| 7,224,082 B2 | 5/2007 | Bouiller et al. | |
| 7,232,290 B2 | 6/2007 | Draper et al. | |
| 7,246,992 B2 | 7/2007 | Lee | |
| 7,251,942 B2 | 8/2007 | Dittmar et al. | |
| 7,287,959 B2 | 10/2007 | Lee et al. | |
| 7,328,580 B2 | 2/2008 | Lee et al. | |
| 7,374,401 B2 | 5/2008 | Lee | |
| 7,495,354 B2 | 2/2009 | Herrmann | |
| 7,537,431 B1 | 5/2009 | Liang | |
| 7,607,891 B2 | 10/2009 | Cherolis et al. | |
| 7,704,039 B1 | 4/2010 | Liang | |
| 7,717,677 B1 | 5/2010 | Liang | |
| 7,721,555 B2 | 5/2010 | Sharp et al. | |
| 7,722,325 B2 * | 5/2010 | Cunha | F01D 5/186 415/115 |
| 7,753,650 B1 | 7/2010 | Liang | |
| 7,785,070 B2 | 8/2010 | Liang | |
| 7,815,414 B2 | 10/2010 | Devore et al. | |
| 7,820,267 B2 | 10/2010 | Fahndrich | |
| 7,927,073 B2 | 4/2011 | Scott et al. | |
| 8,057,182 B2 * | 11/2011 | Brittingham | F01D 5/186 415/115 |
| 8,167,559 B2 * | 5/2012 | Liang | F01D 5/187 415/115 |
| 8,469,666 B1 * | 6/2013 | Liang | F01D 5/187 415/115 |
| 8,777,570 B1 * | 7/2014 | Liang | F01D 5/186 415/115 |
| 2004/0197191 A1 | 10/2004 | Cunha et al. | |
| 2005/0111979 A1 | 5/2005 | Liang | |
| 2007/0044933 A1 | 3/2007 | Santeler | |
| 2008/0265580 A1 | 10/2008 | Sharp | |
| 2009/0020257 A1 | 1/2009 | Frasier et al. | |
| 2009/0047136 A1 | 2/2009 | Chon et al. | |
| 2009/0068022 A1 | 3/2009 | Liang | |
| 2009/0115295 A1 | 5/2009 | Colin | |
| 2009/0274749 A1 | 11/2009 | Johnson | |
| 2010/0054953 A1 | 3/2010 | Piggush | |
| 2010/0068032 A1 | 3/2010 | Liang | |
| 2010/0074763 A1 | 3/2010 | Liang | |
| 2010/0226755 A1 | 9/2010 | Liang | |
| 2010/0247329 A1 | 9/2010 | Morgan | |
| 2010/0290921 A1 | 11/2010 | Mhetras | |
| 2010/0304161 A1 | 12/2010 | Huang et al. | |
| 2011/0068517 A1 | 3/2011 | Maguire et al. | |
| 2011/0110790 A1 | 5/2011 | Itzel et al. | |
| 2012/0201653 A1 | 8/2012 | Moga et al. | |
| 2014/0199177 A1 | 7/2014 | Propheter-Hinckley et al. | |
| 2015/0016944 A1 | 1/2015 | Vandervaart et al. | |

FOREIGN PATENT DOCUMENTS

| | | | |
|---|---|---|---|
| EP | 2159375 A2 | 3/2010 | |
| EP | 1091092 A2 | 1/2011 | |
| WO | WO 2012005324 A1 * | 1/2012 | F01D 5/186 |
| WO | 2012092279 A1 | 7/2012 | |

* cited by examiner

GAS TURBINE ENGINE COMPONENT ARRANGEMENT

CROSS REFERENCE TO RELATED APPLICATIONS

This application claims priority to and the benefit of U.S. Provisional Patent Application No. 61/772,800 filed 5 Mar. 2013, the disclosure of which is now expressly incorporated herein by reference.

TECHNICAL FIELD

The present disclosure generally relates to cooled gas turbine engine components. More particularly, but not exclusively, the present disclosure relates to fluid cooled gas turbine engine components.

BACKGROUND

Providing cooling passageways structured to flow cooling fluids from and within components of gas turbine engines remains an area of interest. Some existing systems have various shortcomings relative to certain applications. Accordingly, there remains a need for further contributions in this area of technology.

SUMMARY

One embodiment of the present invention is a unique gas turbine engine cooled component. Other embodiments include apparatuses, systems, devices, hardware, methods, and combinations for cooling gas turbine engine components. Further embodiments, forms, features, aspects, benefits, and advantages of the present application shall become apparent from the description and figures provided herewith.

DETAILED DESCRIPTION

Figure 1:
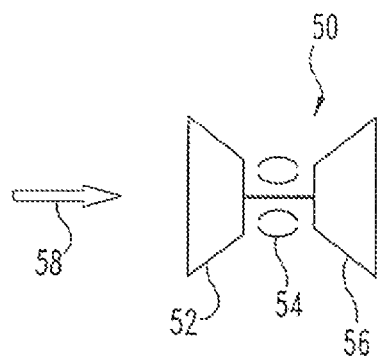
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is depicted having turbomachinery that can be used to provide power to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

In the illustrated embodiment, the gas turbine engine 50 includes a compressor 52, combustor 54, and turbine 56. An incoming flow stream of working fluid 58 is compressed by the compressor 52 after which it is delivered to the combustor 54 to be mixed with a fuel and combusted before being delivered to the turbine 56. The gas turbine engine 50 is depicted as a single spool turbojet engine but, it will be appreciated that the engine 50 can take on a variety of forms and may include additional spools. For example, the engine 50 can be a turboshaft, turboprop, or turbofan engine.

Figure 2:
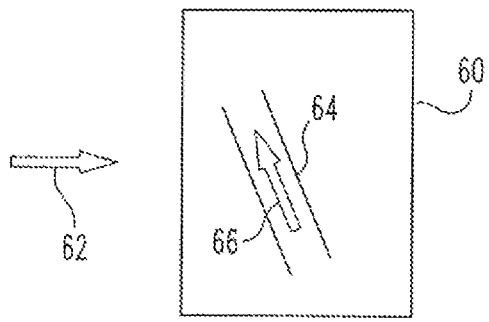
FIG. 2 depicts an embodiment of a gas turbine engine component.

In one form illustrated in FIG. 2, the gas turbine engine 50 can include a component 60 in thermal communication with a flow stream 62 of the gas turbine engine 50. The component 60 includes a throughway 64 such as a hole or passage for the conveyance of a thermal fluid 66 which can, but need not, be the same as the working fluid 58 received and operated upon by gas turbine engine 50. The thermal fluid 66 can be used to exchange heat with the component 60 and the flow stream 62 of the gas turbine engine. For example, if the flow stream 62 is of relatively high temperature then the thermal fluid 66 of one embodiment can be conveyed through the component 60 to keep it, or a portion thereof, at a relatively cool temperature. In this way the thermal fluid 66 acts as a cooling flow. The thermal fluid 66 can originate from a variety of sources, and in one form is from the compressor 52 of the gas turbine engine. In one non-limiting embodiment the thermal fluid 66 is from a compressor discharge of the gas turbine engine 50.

Figure 3:
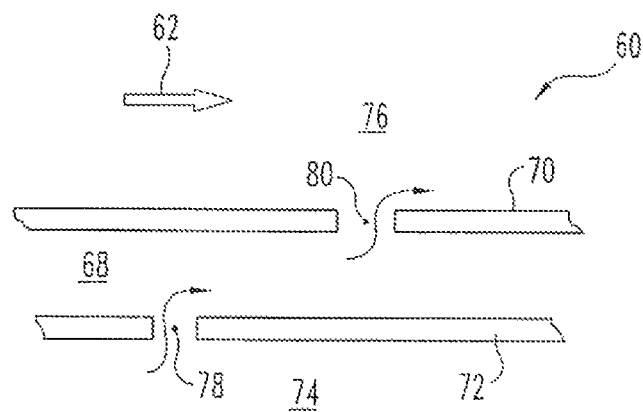
FIG. 3 depicts an embodiment of a gas turbine engine component.

In yet another non-limiting form illustrated in FIG. 3, the component 60 includes a passage 68 disposed between a top wall 70 and bottom wall 72 and within which the thermal fluid 66 can traverse. As used herein, spatial relation terms such as "top", "bottom", etc, are used for ease of convenience with the illustrated drawings as depicted and are not intended to limit any given embodiment of a component 60 in its placement within the gas turbine engine 50 unless indicated to the contrary. Additionally, different embodiments herein may be discussed as having a feature associated with "bottom" portion. For example, in some embodiments a "bottom wall" can be discussed as having a certain type of hole configuration, for example. Any given feature present in a "bottom" portion in one embodiment can also be present in a "bottom" portion, in another embodiment, but such a direct comparison is not intended and may not be appropriate for all embodiments. Thus, unless indicated to the contrary, a feature present in a "bottom" portion of one embodiment can be present in a "top" portion of another embodiment, and vice versa.

As shown in the illustrated embodiment of FIG. 3, the walls 70 and 72 can be arranged in a layered structure. Such a layered structure can have flow path configurations similar to a cooled component constructions similar to those of cooled components sold under the trademark of LAMILLOY by Rolls-Royce Corporation, Indianapolis, Ind.

In the illustrative embodiment, the thermal fluid 66 is in the form of a cooling fluid and as such it flows from a cold side 74 to a hot side 76 to aid in cooling a temperature of the component 60 when exposed to the flow stream 62. The cold side 74 can represent a large area through which a relatively cool fluid passes. In some forms the cold side 74 can represent an internal plenum such as in a cooled turbine vane and/or blade. Holes 78 and 80 are disposed in the bottom wall 72 and top wall 70, respectively, and through which is allowed to pass the thermal fluid 66 as it flows from the cold side 74 to the hot side 76. Though only a single hole is illustrated in each of the cold side 74 and hot side 76, other embodiments can include additional holes in either or both of the cold side 74 and the hot side 76. In still further additional embodiments, the component 60 can have any number of supports disposed in the passage 68. Various embodiments of the passages and holes will be described further below.

Figure 4A:
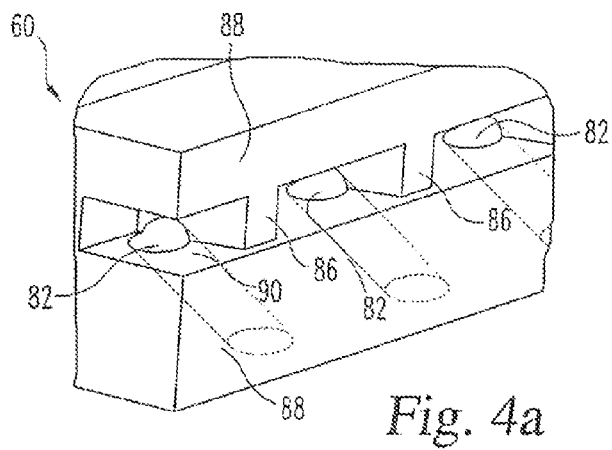
FIG. 4a depicts an embodiment of a gas turbine engine component.
Figure 4C:
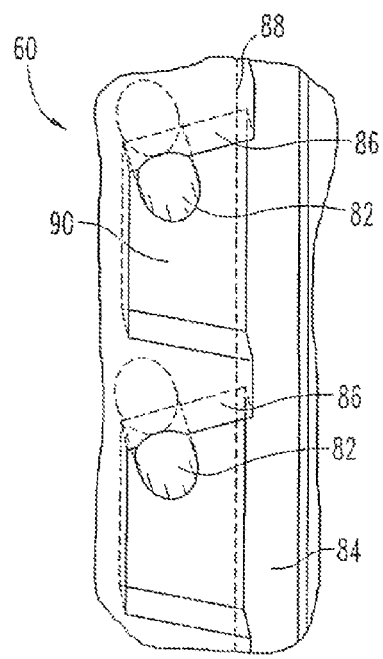
FIG. 4c depicts an embodiment of a gas turbine engine component.
Figure 4B:
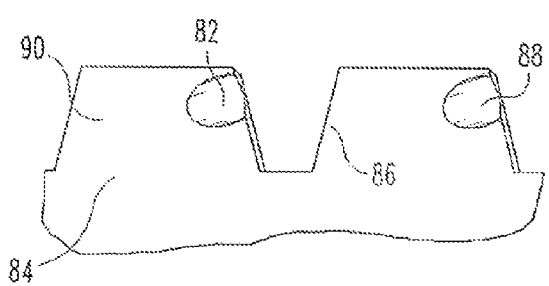
FIG. 4b depicts an embodiment of a gas turbine engine component.

The component 60 can be any device useful with the gas turbine engine 50, and, in some non-limiting forms, it can be a device useful in a hot section of the gas turbine engine 50. To set forth just one embodiment among potential others, the component 60 can take the form of an air cooled turbine vane and/or blade having internal passages for the conveyance of a cooling fluid. The cooling air used in the turbine vane and/or blade can originate from a variety of different sources, and, in one form, originates from a compressor discharge of the gas turbine engine 50. The cooled turbine component can have one or more holes leading from an internal passage to a hot exhaust stream through the turbine. In some forms, the cooled turbine component is a multi-walled assembly Turning now to another embodiment of the component 60, FIGS. 4a, 4b, and 4c illustrate a hole 82 formed through a bottom wall 84 of a component 60. The hole 82 emerges through both the bottom wall 84 and a support 86 disposed between the bottom wall 84 and top wall 88 and into a cavity 90. A fluid can rise through the hole 82 and exit into the cavity 90 in some forms, while in other forms the cavity can be used to collect the fluid prior to entering the hole 82. The support 86 can be a pedestal between walls, and in some forms the support 86 is situated in a passage such that a fluid can flow around all sides of the pedestal. In still other forms, the support 86 can be a lateral wall that provides a boundary for a passage disposed between the bottom wall 84 and top wall 88.

The orientation of the hole 82 as it emerges through the bottom wall 84 and the support 86 is such that it is at an angle to both. The surface area of the bottom wall 84 and surface area of the support 86 that the hole emerges through can, but need not be equal. For example, in some forms the hole 82 can be disposed more toward the wall 84 than through the support 86 such that relatively more area is devoted to the hole 82 in the wall 84 than in the support 86.

The hole 82 can have a number of configurations/orientations/etc. For example, though the hole 82 is depicted as circular in cross section in the illustrated embodiment, other cross sectional shapes are also contemplated. As shown in FIG. 4c, the hole 82 is depicted as extending substantially along a line oriented at an angle to a surface of the bottom wall 84 and support 86, but in other embodiments the hole 82 can include bends, curves, etc, in which the hole 82 may not extend substantially along a line.

As shown in the illustrated embodiment, a number of holes 82 can be used in the component 60. Not all holes need be the same. For example, one or more holes 82 can be disposed relatively more toward one of the bottom wall 84 and the support 86, while other of the holes 82 are disposed in the opposite orientation. Furthermore, the cross sectional shape, and route through the bottom wall 82 can also be different across one or more holes 82. Though not depicted in the illustrated embodiment, holes 82 can also be formed through the top wall 88 and oriented to exit out of both the top wall 88 and the support 86, in similar fashion to the holes 82 disposed in the bottom wall 84.

Figure 5A:
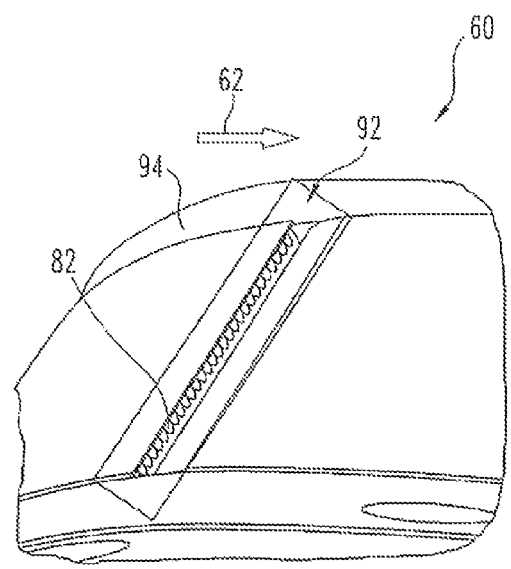
FIG. 5a depicts an embodiment of a gas turbine engine component.
Figure 5B:
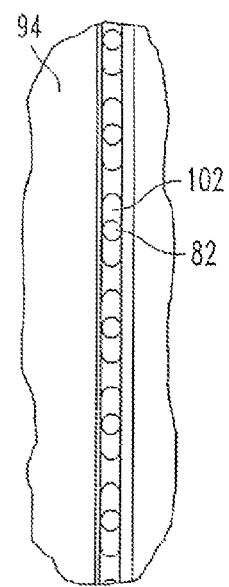
FIG. 5b depicts an embodiment of a gas turbine engine component.
Figure 5C:
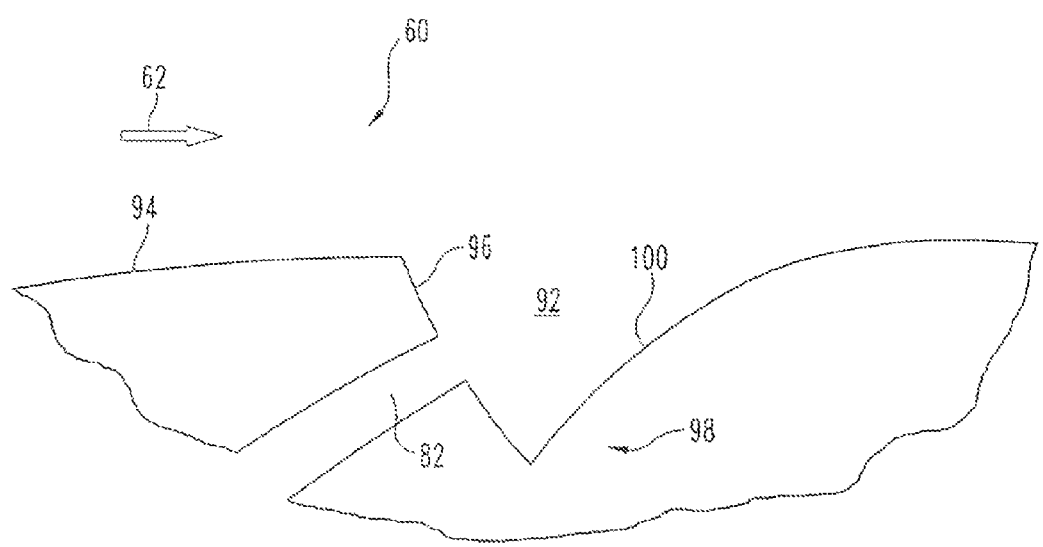
FIG. 5c depicts an embodiment of a gas turbine engine component.

Turning now to FIGS. 5a, 5b, and 5c, a hole 82 is shown as exiting into a trench 92 formed in a surface 94 of a component 60. The trench 92 extends generally along a line and includes a trench face 96 disposed at an angle to the surface 94. In some forms the trench 92 extends along a line in the direction of a span of a blade and/or vane, but other orientations are also contemplated. For example, the trench 92 can extend at an angle to the span, to set forth just one non-limiting embodiment. The angle can be an acute angle as measured between the trench face 96 and an extension of the surface 94 past the trench face 96 as shown in the illustrated embodiment, but other orientations are also contemplated herein. The trench face 96 can take a variety of forms as it extends along the trench 92, whether flat, curved, etc. Furthermore, the trench face 98 can vary along the length of the trench 92.

The hole 82 includes an exit portion that is disposed at a substantially right angle to the trench face 96. In one form the exit portion is at a right angle. The exit portion can coincide with a remainder of the hate 82 from an entrance portion, intermediate portion, etc, as the hole 82 traverses between a cold side and hot side. For example, the hole can extend in a generally linear fashion between an entrance and exit, but other shapes are also contemplated herein. As shown in the illustration, in one form the exit can be disposed midway between the surface 94 and a bottom 98 of the trench 92, but in other forms the hole 82 can be disposed at any location intermediate the surface 94 and the bottom 98. An opposing face 100 forms another side of the trench 92 and can take a variety of forms whether flat, curved, etc. Furthermore, the opposing face 100 can vary along the length of the trench 92. Such a variation can correspond to variations in the trench face 96, but not all embodiments need to have a one-to-one correspondence of variations.

In the embodiment depicted in FIG. 5b, the hole 82 includes a portion 102 near the exit that diverges such as to create a diffusion of a fluid flowing out of the hole 82. The portion 102 extends along the direction of the trench 92 in the illustrated embodiment, but in other embodiments can alternatively and/or additionally diverge toward either or both of the top and bottom of the trench 92 as depicted. The portion 102 diverges equally on either side of the hole 82, but some embodiments can extend unequally away from any side of the hole 82. Furthermore, the portion 102 can diverge in any manner of shape as will be appreciated. The illustrated embodiment includes a number of holes 82 disposed in the trench, but other embodiments can include fewer or more holes 82 disposed in the trench 92. In some forms a trench having a single hole can be used.

Figure 6A:
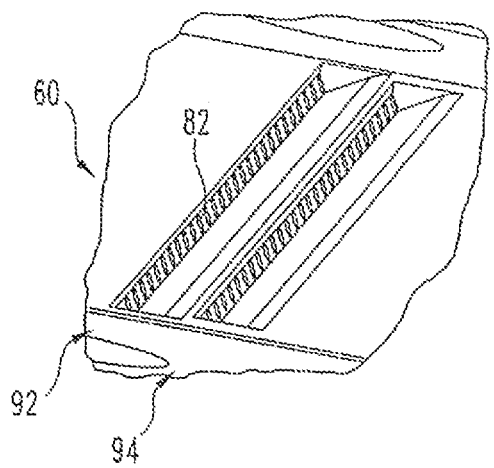
FIG. 6a depicts an embodiment of a gas turbine engine component.
Figure 6B:
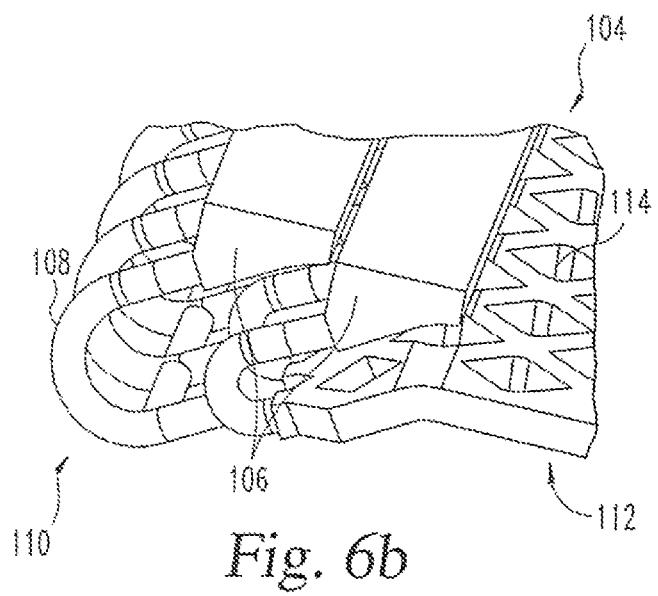
FIG. 6b depicts an embodiment of a mold for a gas turbine engine component.

Turning now to FIGS. 6a and 6b, an embodiment is shown of a component 60 and a mold 104 useful to produce the component 60 which includes multiple trenches 92 (formed by mold trench portions 106) that include holes 82 (formed by mold hole portions 108) having a turned portion (formed by mold turned portion 110). In the non-limiting embodiment depicted in the figures, the component 60 includes two trenches 92, but other embodiments having the holes 82 with turned portion can include fewer or additional trenches.

The trenches 92 depicted in FIG. 6a can include holes that are arranged as described in the various embodiments above related in any respect to FIGS. 5a and 5b, but not all embodiments having one or more trenches need to include holes 82 arranged according to the embodiments described above. One or more trenches can include holes that are arranged at other than right angles to the trench face. The trenches can additionally and/or alternatively include any of the variations discussed herein with respect to the various embodiments.

The turned portion can be formed in any location with regard to the component 60. In the embodiments in which the component 60 takes the form of a blade or vane, the turned portion can be located near a leading edge, to set forth just one non-limiting location for the blade or vane.

In one embodiment the turned portion takes the form of a j-shape in which the hole 82 is shaped to reverse the direction of a working fluid flowing in the hole 82. The turned portion can be a constant radius turn in some forms but need not be constant radius in all embodiments. In some embodiments the turned portion of the j-shape need not completely reverse direction of the working fluid. In still further embodiment, the hole 82 can include portions on either side of the turned portion that are substantially similar such that the passage is similar to a u-shape. In a still further form, the portions on either side of the turn may also include turns whether or not to the degree as depicted in the embodiment shown in the figure. Other shapes that include similar turns are also contemplated herein. As such, turns are contemplated herein in the hole 82 that include smooth curvilinear shapes, piecewise curvilinear shapes, and/or piecewise continuous shapes that have a general curved nature. In short, any variety of turned portions, and variations on either side of the turned portions, are contemplated herein for the hole 82.

The hole 82 in many embodiments is elongate having a cross sectional dimension smaller in dimension than the elongate length of the hole 82. For example, a cross sectional dimension such as a width, or perhaps a radius, is smaller than the elongate length of the hole 82. The elongate length of the hole 82 can be the length of a line of the hole 82 such as a line formed along the length of the hole 82 through a centroid, geometric center, median center, etc. of the cross sectional shape. In some holes 82 having non-circular shape, the width referred to can be, for example, the largest cross sectional dimension of the hole 82. To set forth a non-limiting example, if the hole 82 were of a rectangular shape, the width can be the largest of the cross sectional dimensions associated with the rectangle. If the shape were ellipsoidal, the width can be a dimension such as the major axis. In any event, it will be appreciated that no matter the measure of width a cross sectional dimension such as maximum width useful in defining, partially defining, or at least characterizing the hole 82 in some fashion will be appreciated as less than the elongate length of the passage. As suggested in the discussion above, the hole 82 can have a circular cross sectional shape in some embodiments, but other shapes are also contemplated. Furthermore, the cross sectional shape of the hole 82 can vary over the length of the hole 82 where in some cases it will still be the case that the elongate length is longer than a cross sectional dimension of the hole 82.

In some forms the hole 82, whether of the embodiments depicted in the figures of the illustrated embodiments or variations described herein, is generally free from structural members that extend from one side of the cross section to the other such as to form a blockage on either side of which working fluid can pass. For example, in some forms the hole 82 can be formed without pedestal support typically used between walls of an open interior of a cooled component.

The embodiment depicted in FIG. 6b discloses multiple trenches having holes 82 that include turned portions, but other embodiments can include trenched components having holes other than those with turned portions. For example, one or both trenches can have holes other than those with turned portions. Furthermore not all holes 82 associated with any given trench need to include turned portions.

The component 60 can include an internal passage as shown via the mold internal passage 112 depicted in FIG. 6b. The mold internal passage 112 is shown having criss-crossed internal flow paths with provisions 114 made for the formation of supports which can take the form of pedestals. Any variety of configurations of the internal passage are contemplated, as are any variety of configurations of the supports, including any of the variations disclosed herein regarding cooling holes with respect to supports such as pedestals.

The mold of the embodiment depicted in FIG. 6b, as well as any other mold described in the instant application or otherwise understood to be useful to making any of the components described herein, can be produced using any variety of techniques, including free form fabrication methods. To set forth just one non-limiting example, the mold can be produced from a green article developed through laser stereolithography and in which the green article is processed to remove a cured binder and thereafter sintered to a final ceramic mold form. Other techniques are also contemplated.

Figure 7:
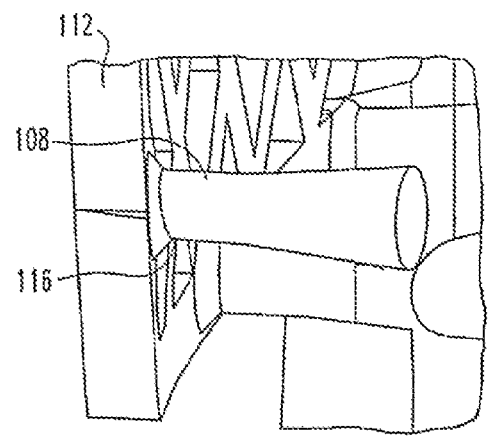
FIG. 7 depicts an embodiment of a mold for a gas turbine engine component.

Turning now to FIG. 7, an embodiment of a mold showing a mold hole portion 108 connected with a mold internal passage 112. The mold hole portion 108 includes a neck 116 intermediate to ends of the mold hole portion 108. Though the mold hole portion 108 is connected with the mold internal passage 112, not all embodiments need to be connected as such, as is similar to variations in any of the other embodiments described herein. The neck 116 is shown disposed toward the mold internal passage 112 in the illustrated embodiment, but not all embodiments need to be disposed as such. For example, the neck 116 can be disposed toward an opposite end of the internal passage 112.

The neck 116 is disposed between an upstream side of passage 112 and a downstream side of passage 112. The upstream and downstream sides of passage 112 can have the same general configuration, such as cross sectional shape, or can have different configurations. In some forms the inlet to the upstream side and the outlet from the downstream side can have the same cross sectional areas, but not all embodiments need include the same cross sectional areas. In some embodiments a wall forming the upstream side of the passage 112 can have a different angle of divergence from a reference axis, such as a centerline axis, than an angle of divergence of a wall that forms the downstream side of passage 112. To set forth just one non-limiting embodiment, where the cross sectional shapes are the same, a non-limiting example of which would be a circular cross sectional shape, the angle of the wall forming the upstream side of the passage can be different than the angle of the wall forming the downstream side of the passage.

Figure 8:
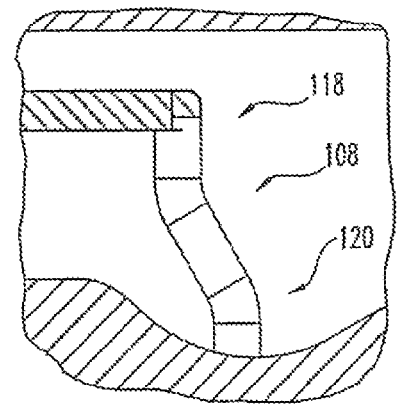
FIG. 8 depicts an embodiment of a mold for a gas turbine engine component.

Turning now to FIG. 8, an embodiment of a mold is shown in which a mold hole portion 108 is shown having turns between an upstream side 118 and a downstream side 120. The turns can be used, to reduce a total pressure of fluid that would pass through a hole produced using the mold hole portion 108. The loss of total pressure can be used to simulate a smaller sized hole, which correspondingly permits a larger size mold hole portion 108 to be used to lessen the likelihood of lower yields associated with the production or use of the mold. Any number of turns, angles, configurations, etc. can be used to reduce the total pressure to a suitable value. The turns provided in the mold hole portion 108 thus produce an interrupted flow pathway between an entrance to the hole and an exit from the hole such that a line of sight from some, or all, of a portion of the entrance to the exit is obstructed. In the illustrated embodiment near total obstruction is provided such that there is no line of sight between the entrance and exit, but it will be appreciated that some embodiments may provide for at least a limited line of sight. It will be appreciated furthermore that although a line of sight may be obstructed, either totally or partially, that the entrance and exit can be aligned along an axis the intermediate portion of the passage is not aligned on the axis.

Figure 9:
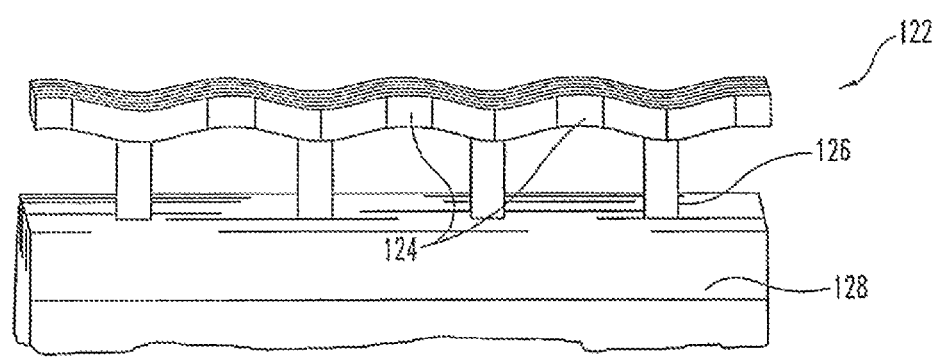
FIG. 9 depicts an embodiment of a mold for a gas turbine engine component.

FIG. 9 discloses a corrugated cooling passage mold 122 having a plurality of voids 124 where corresponding pedestals will be formed subsequent to a cooling operation. Though the mold 122 includes voids 124 to form pedestals in the illustrated embodiment, not all embodiments of the corrugated cooling passage mold 122 need to include voids. The corrugated cooling passage mold 122 is connected via passage mold segments 126 to a cavity mold 128 useful to form a cooling passage in a cast component. The corrugated cooling passage mold 122 forms an undulating passage between walls of a component when the mold is used to produce the component. One of the walls that the corrugated passage undulates toward and away from can include an outer hot wall of a multi-wall component. The outer hot wall, therefore, can have a thickness that varies as a result of the variation of the corrugated passage from the corrugated passage mold 122. Another of the walls that the corrugated passage undulates toward and away from can include a cool inner wall that forms a boundary for an inner cavity, such as an inner cooling space. The inner cool wall can have a constant thickness along its length, and thus have an undulating appearance as well. In alternative embodiments the inner wall can be formed by a relatively flat side that forms a boundary of the inner cooling cavity, while the other side undulates with the undulating cooling passage.

The corrugated cooling passage mold 122 can have any number of variations in thickness, width, length, undulating pattern, orientation relative to the component and/or passing flow stream, spacing of voids, number of voids, shapes of voids, etc. For example, the corrugated mold 122 can have a thickness that varies from an upstream side to a downstream side. In some embodiments the undulating shape can provide increased stiffness with relatively no change in cooling effectiveness. In addition, the corrugated cooling passage mold 122 has a length greater than the thickness as can be seen in the illustrated embodiment. The width of the corrugated cooling passage mold 122 can also be larger than the thickness. In some forms one or both of the length and width can be larger than the thickness. The pattern of undulations can be regular and repeating, such as a sinusoid, or can be irregular, or piecewise regular, etc. The undulating pattern can extend over a length that is in the same direction as a passing flow stream.

As will be appreciated given the discussion above, some embodiments of the present application are described in terms of gas turbine engine components made from one or more molds, while other describe the molds themselves. It will be appreciated that unless stated to the contrary, any particular mold or embodiments therefore that are discussed above are capable of producing a component made from the mold, such as through an investment casting operation. Likewise it will be appreciated that any particular component described above can be made with a corresponding mold produced to form any of the features described. Lastly, any given component can include any combination of the various features described above.

Any of the embodiments described above are stand alone embodiments independent of the others, but in some applications various of the embodiments can also be used with any of the other embodiments. For example, any of the holes disclosed in any given embodiment can be used in other embodiments. The holes 82 and support 86 arrangement of FIGS. 4a-4c can be used in embodiments disclosed in the other figures, and vice versa. Unless prohibited to the contrary, the features associated with the holes 82, supports 86, trenches, and passages disclosed in any given embodiment are permitted to be used in other embodiments.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an" "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising
a cooled gas turbine engine component having an outer surface and an internal space for the conveyance of a relatively pressurized cooling fluid,
a trench formed in the cooled gas turbine engine component having an upstream side disposed below and at an angle relative to the outer surface of the cooled gas turbine engine component and a downstream side that intersects the upstream side of the trench at a bottom of the trench, the downstream side being continuous without holes, and
a plurality of cooling holes configured to exit substantially perpendicular to the upstream side of the trench intermediate the outer surface of the cooled gas turbine engine component and the bottom of the trench, each of the plurality of cooling holes being j-hook shaped and including an upstream portion in proximity to the internal space, a downstream portion spaced apart from the upstream portion and having an exit formed in the upstream side of the trench, and an intermediate curved portion extending between the upstream portion and the downstream portion, and the downstream portion of each of the plurality of cooling holes is spaced apart from the bottom of the trench.

2. The apparatus of claim 1, wherein the cooled gas turbine engine component includes a multi-wall construction formed to define the internal space that supplies the relatively pressurized cooling fluid to the cooling holes.

3. The apparatus of claim 2, wherein the cooled gas turbine engine component is a cast article having a plurality of pedestals formed in the internal space to define a plurality of internal passages having criss-crossed internal flow paths.

4. The apparatus of claim 3, wherein the cast article is an airfoil shaped component.

5. The apparatus of claim 4, wherein the airfoil shaped component is one of a turbine blade and a turbine vane.

6. An apparatus comprising
a gas turbine engine component having a hot side flow surface and an internal cooling passage configured to convey a cooling fluid,
a trench formed in the gas turbine engine component having a trench surface disposed below the hot side flow surface and an opposing surface that intersects the trench surface at a bottom of the trench, the opposing surface being continuous without holes, and
a plurality of cooling holes in cooling fluid communication with the internal cooling passage, each of the plurality of cooling holes having an upstream portion in proximity to the cooling passage, a downstream portion positioned opposite the upstream portion and having an exit formed in the trench surface of the trench, and an intermediate curved portion extending between the upstream portion and the downstream portion, and
wherein the downstream portion of each of the plurality of cooling holes is disposed between and spaced apart from the bottom of the trench and the hot side flow surface and the plurality of cooling holes are j-hook shaped cooling holes.

7. The apparatus of claim 6, wherein each exit of the plurality of cooling holes is perpendicular to the trench surface.

8. The apparatus of claim 6, which further includes another trench through which cooling fluid is discharged from the gas turbine engine component and the another trench includes another plurality of cooling holes that are in fluid communication with the plurality of cooling holes.

9. The apparatus of claim 6, wherein the gas turbine engine component is a multi-walled cooled component having the internal cooling passage disposed between a first and a second wall.

10. The apparatus of claim 8, wherein the gas turbine engine component further includes a plurality of pedestals arranged in the internal cooling passage to define a plurality of internal passages having criss-crossed internal flow paths.

11. An apparatus comprising
a gas turbine engine component including an outer wall that defines a hot side flow surface, an inner wall spaced apart from the outer wall to define an internal passage between the outer wall and the inner wall, and a plurality of pedestals that extend between the outer wall and the inner wall to form a plurality of criss-crossed internal flow paths in the internal passage,
a first trench formed in the gas turbine engine component having a first trench face that extends away from the hot side flow surface toward the inner wall and a first opposing face that intersects the first trench face at a bottom of the trench and extends away from the inner wall toward the outer wall, and
a plurality of first cooling holes that extend between the outer wall and the inner wall, each of the first cooling holes having an upstream portion that opens into one of the criss-crossed internal flow paths formed in the internal passageway, a downstream portion that opens into the first trench face, and a j-shaped intermediate curved portion that extends between the upstream portion and the downstream portion, wherein the downstream portion is spaced apart from the bottom of the trench and the hot side flow surface.

12. The apparatus of claim 11, further comprising a second trench and a plurality of second cooling holes, the second trench is formed in the gas turbine engine component and includes a second trench surface that extends away from the hot side flow surface toward the inner wall and a second opposing surface that intersects the second trench surface and extends away from the inner wall toward the outer wall, each of the second cooling holes extends between the outer wall and the inner wall and has an upstream portion that opens into the j-shaped intermediate curved portion of one of the first cooling holes, a downstream portion that opens into the second trench surface, and a j-shaped intermediate curved portion that extends between the upstream portion and the downstream portion of the second cooling hole.

13. The apparatus of claim 12, further comprising a plurality of distributor holes located between the outer wall and the inner wall and each distributor hole extends between and opens into adjacent second cooling holes.

\* \* \* \* \*